(12) United States Patent
Bao

(10) Patent No.: US 10,530,911 B2
(45) Date of Patent: Jan. 7, 2020

(54) ELECTRONIC DEVICE AND DISPLAY SCREEN

(71) Applicant: GUANGDONG OPPO MOBILE TELECOMMUNICATIONS CORP., LTD., Dongguan, Guangdong (CN)

(72) Inventor: Xiaoming Bao, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/881,739

(22) Filed: Jan. 27, 2018

(65) Prior Publication Data

US 2018/0316784 A1 Nov. 1, 2018

(30) Foreign Application Priority Data

Apr. 27, 2017 (CN) .......................... 2017 1 0289873

(51) Int. Cl.
| | | |
|---|---|---|
| H04M 1/02 | (2006.01) | |
| G06F 1/16 | (2006.01) | |
| G09G 3/20 | (2006.01) | |
| H04N 5/225 | (2006.01) | |
| H04N 7/01 | (2006.01) | |

(52) U.S. Cl.
CPC ........ *H04M 1/0266* (2013.01); *G06F 1/1637* (2013.01); *G06F 1/1686* (2013.01); *G09G 3/20* (2013.01); *H04N 5/2252* (2013.01); *H04N 7/0127* (2013.01); *G09G 2340/0435* (2013.01); *H04N 5/2258* (2013.01)

(58) Field of Classification Search
CPC .. H04M 1/0266; H04N 7/0127; G06F 1/1686; G06F 1/1637
USPC .................................. 455/550.1, 556.1, 566
See application file for complete search history.

(56) References Cited

U.S. PATENT DOCUMENTS

| | | | |
|---|---|---|---|
| 2011/0285644 A1* | 11/2011 | Chang .................. | G06F 3/0416 345/173 |
| 2013/0094126 A1 | 4/2013 | Rappoport et al. | |
| 2016/0042707 A1* | 2/2016 | Wang ................... | G09G 3/2044 345/214 |
| 2016/0378334 A1* | 12/2016 | Liu ....................... | G06F 3/0481 715/794 |

FOREIGN PATENT DOCUMENTS

| | | |
|---|---|---|
| CN | 1705008 A | 12/2005 |
| CN | 101833420 A | 9/2010 |
| CN | 103903583 A | 7/2014 |
| CN | 103905623 A | 7/2014 |

(Continued)

OTHER PUBLICATIONS

PCT/CN2018/076463 English Translation of International Search Report and Written Opinion dated May 21, 2018, 8 pp.

(Continued)

*Primary Examiner* — Ayodeji O Ayotunde

(57) ABSTRACT

An electronic device is provided. The electronic device includes a display screen, the display screen includes a display area, the display area includes a low-frequency display sub-area, and the display screen is provided with a slot in the low-frequency display sub-area. A change frequency of a display content in the low-frequency display sub-area is lower than a preset frequency threshold.

19 Claims, 13 Drawing Sheets

(56) References Cited

FOREIGN PATENT DOCUMENTS

| | | |
|---|---|---|
| CN | 106293444 A | 1/2017 |
| CN | 107145192 A | 9/2017 |
| EP | 3355571 A1 | 8/2018 |
| TW | 201332336 A | 8/2013 |
| TW | 201426526 A | 7/2014 |
| TW | 201537551 A | 10/2015 |
| TW | 201642121 A | 12/2016 |

OTHER PUBLICATIONS

European Patent Application No. 18156602.7, Extended Search and Opinion dated Jun. 18, 2018, 10 pages.
Taiwanese Patent Application No. 106143412, Office Action dated Jun. 26, 2018, 5 pp.
Chinese Patent Application No. 201710289873.2, English translation of Office Action dated Mar. 4, 2019, 10 pages.
Chinese Patent Application No. 201710289873.2, Office Action dated Mar. 4, 2019, 8 pages.
European Patent Application No. 18156602.7, Office Action dated May 6, 2019, 6 pages.

\* cited by examiner

ELECTRONIC DEVICE AND DISPLAY SCREEN

CROSS-REFERENCE TO RELATED APPLICATION

This application claims priority to and benefits of Chinese Patent Application No. 201710289873.2, filed with the State Intellectual Property Office on Apr. 27, 2017, the entire content of which is incorporated herein by reference.

FIELD

The present disclosure relates to a technical field of electronic devices, and more particularly to an electronic device with display screen.

BACKGROUND

With developments of technology, electronic devices are more and more widely used, and have more and more functions. Typically, electronic devices with display screens have been necessary electronic devices for people in daily life.

SUMMARY

Embodiments of a first aspect of the present disclosure provide an electronic device.

The electronic device according to embodiments of the present disclosure includes a display screen, the display screen includes a display area, the display area includes a low-frequency display sub-area, a change frequency of a display content in the low-frequency display sub-area is lower than a preset frequency threshold, and the display screen is provided with a slot in the low-frequency display sub-area.

Embodiments of a second aspect of the present disclosure provide an electronic device.

The electronic device according to embodiments of the present disclosure includes a body and a display screen disposed in the body, the display screen includes a low-frequency display area, a change frequency of a display content in the low-frequency display area is lower than a preset frequency threshold, and the display screen is provided with a slot in the low-frequency display area.

Embodiments of a third aspect of the present disclosure provide a display screen.

The display screen according to embodiments of the present disclosure includes a display area, the display area includes a low-frequency display sub-area, a change frequency of a display content in the low-frequency display sub-area is lower than a preset frequency threshold, and the display screen has a slot in the low-frequency display sub-area.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from descriptions made with reference to following drawings.

DETAILED DESCRIPTION

Figure 1:
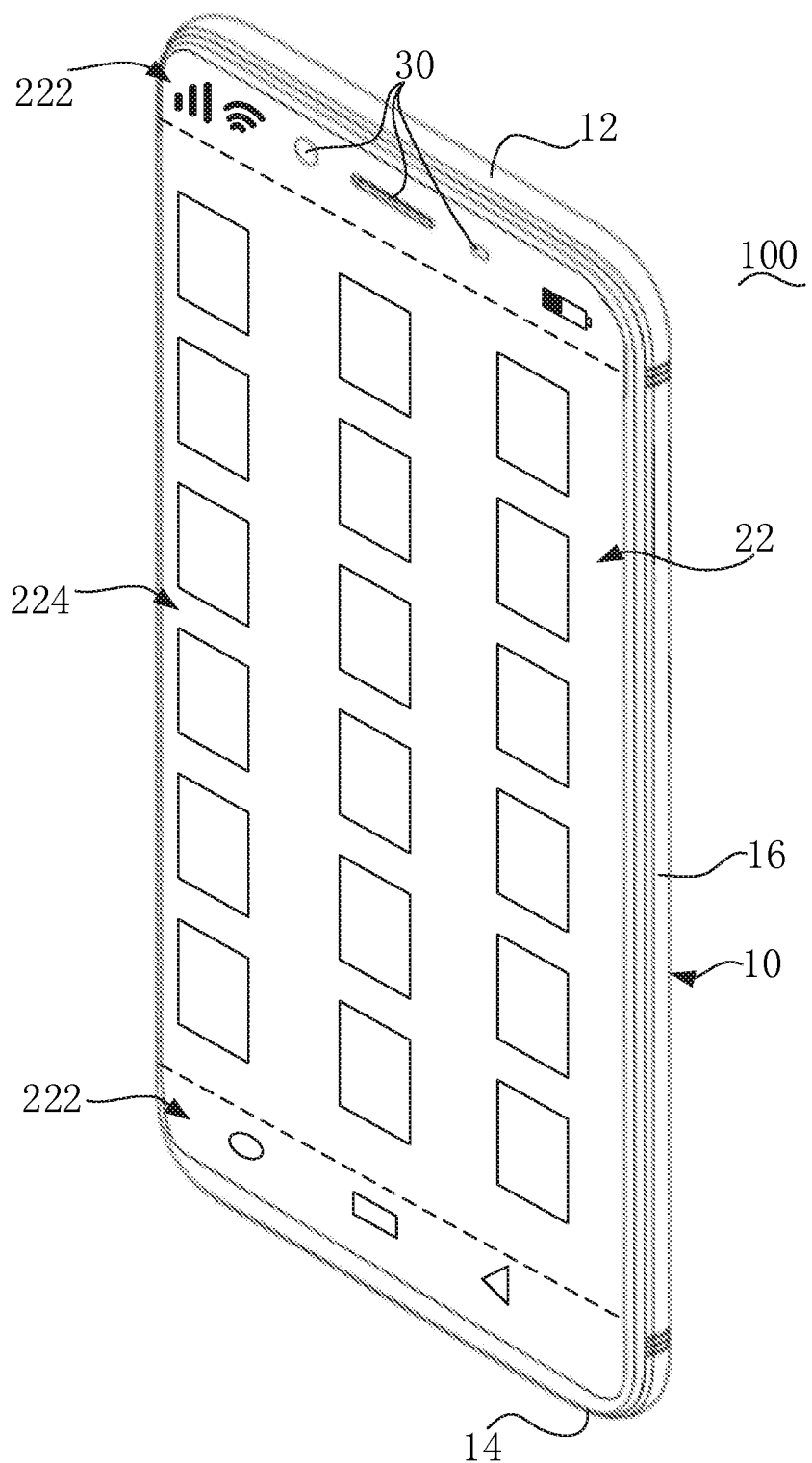
FIG. 1 is a perspective view of an electronic device according to an embodiment of the present disclosure.

Reference will be made in detail to embodiments of the present disclosure. The embodiments shall not be construed to limit the present disclosure. The same or similar elements and the elements having same or similar functions are denoted by like reference numerals throughout the descriptions.

The embodiments described herein with reference to drawings are explanatory, and used to generally understand the present disclosure, and shall not be construed to limit the present disclosure.

In the present disclosure, unless specified or limited otherwise, a structure in which a first feature is "on" or "below" a second feature can include an embodiment in which the first feature is in direct contact with the second feature, and can also include an embodiment in which the first feature and the second feature are not in direct contact with each other, but are contacted via an additional feature formed therebetween. Furthermore, a first feature "on", "above" or "on top of" a second feature can include an embodiment in which the first feature is right or obliquely "on" "above" or "on top of" the second feature, or just means that the first feature is at a height higher than that of the second feature; while a first feature "below", "under" or "on bottom of" a second feature can include an embodiment in which the first feature is right or obliquely "below", "under" or "on bottom of" the second feature, or just means that the first feature is at a height lower than that of the second feature.

Figure 2:
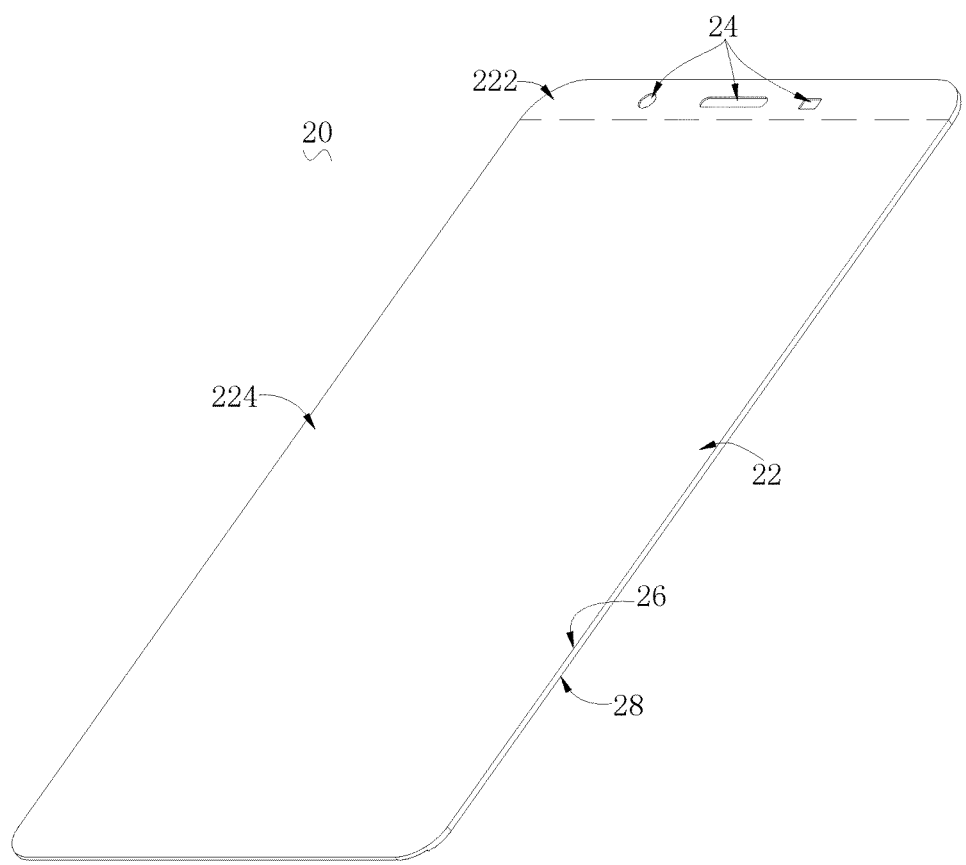
FIG. 2 is a perspective view of a display screen according to an embodiment of the present disclosure.

As illustrated in FIGS. 1 and 2, an electronic device 100 according to embodiments of the present disclosure includes a body 10, a display screen 20 and an input-output component 30. The electronic device 100 can be a mobile phone, a tablet phone, a smart watch or the like. The mobile phone is elaborated as an example of the electronic device 100 in the present embodiment.

The body 10 includes a top portion 12, a bottom portion 14 and a lateral portion 16. The top portion 12 and the bottom portion 14 are respectively located at two opposite sides of the body 10. For example, as shown in FIG. 1, the top portion 12 is located at an upper side of the body 10, and the bottom portion 14 is located at a lower side of the body 10. The lateral portion is connected with the top portion 12 and the bottom portion 14. The body 10 can be a carrier for mounting components of the electronic device 100. For example, the display screen 20 and the input-output component 30 of the electronic device 100 can be mounted to the body 10. The body 10 can also provide protection for the electronic device 100, e.g. enabling the electronic device 100 to be not easy to disintegrate or deform when the electronic device 100 is dropped or compressed, or preventing the electronic device 100 from being subject to an erosion of rain and dust. In embodiments of the present disclosure, the body 10 presents a shape of a filleted rectangle on the whole, and the top portion 12 is substantially parallel to the bottom portion 14. The top portion 12, the bottom portion 14 and the lateral portion 16 can be provided with an interface or a key. For example, the bottom portion 14 is provided with a USB interface, the top portion 12 is provided with an earphone interface, and the lateral portion 16 is provided with a power button and a data-card slot, so as to achieve a function extension of the electronic device 100.

The display screen 20 includes a display area 22 which covers a region enclosed by the top portion 12, the bottom portion 14 and the lateral portion 16 of the body 10. That is, the display area 22 is configured as a full-screen display area. The display area 22 includes image pixels for displaying data information such as videos, images, texts, icons or the like. The display screen 20 can be one of an organic light-emitting diode (OLED) display screen, a flexible OLED display screen or a liquid crystal display (LCD) screen. It can be understood that, the electronic device 100 can display image information through the display screen 20, and also, a user can operate the electronic device 100 correspondingly in the light of information displayed by the display screen 20, so as to achieve an interaction between the electronic device 100 and the user. In addition, due to factors such as a specific type of the electronic device 100, an operating system used in the electronic device 100 and using habits of the user, display contents in different sub-areas of the display area 22 will change in different frequencies, that is refresh frequencies of the display contents are different. In some embodiments of the present disclosure, the display area 22 can include a high-frequency display sub-area 224 (e.g. a middle portion of the display area 22) in which the change frequency or the refresh frequency of the display content is large, and a low-frequency display sub-area 222 (e.g. a portion of the display area 22, adjacent to the top portion 12) in which the change frequency or the refresh frequency of the display content is small.

The high-frequency display sub-area 224 and the low-frequency display sub-area 222 can be differentiated in the light of configurations of the electronic device 100 and requirements of the user when the electronic device 100 leaves the factory. In some embodiments, a change of the display content in each sub-area of the display area of a sample of the electronic device (which is not provided with a slot 24) can be detected during a normal usage of the sample of the electronic device, so as to obtain the change frequency or the refresh frequency of each unit area of the display area, for example the refresh frequency of each pixel or each several pixels. In some embodiments of the present disclosure, a screenshot of the display content in the display area can be captured by the electronic device in a preset time interval in background, and then properties such as a color temperature or a lightness of each unit area of multiple screenshots are analyzed, so as to judge whether the display content of such unit area changes. If the display content of such unit area changes, the refresh frequency of the display content is calculated further. In embodiments of the present disclosure, the refresh frequency of each unit area can be detected in other ways, which will not be elaborated herein.

In some embodiments of the present disclosure, in an embodiment, the high-frequency display sub-area 224 is a sub-area in the display area 22, in which the change frequency of the display content is larger than or equal to a preset frequency threshold, and the low-frequency display sub-area 222 is a sub-area in the display area 22, in which the change frequency of the display content is lower than the preset frequency threshold.

In some embodiments of the present disclosure, by comparing the change frequency of the display content of a certain sub-area in the display area 22 with the preset frequency threshold, the display area 22 is divided into the low-frequency display sub-area 222 and the high-frequency display sub-area 224, in which the change frequency of the display content is defined as times the display content of a certain sub-area in the display area 22 changes per unit time, while the frequency threshold is defined as a limit to the change frequency of the low-frequency display sub-area. A specific value of the frequency threshold is related to the specific type of the electronic device 100, the operating system of the electronic device 100 and the using habits of the user. For example, the frequency threshold can be 15 times per minute, 10 times per minute, 8 times per minute, 6 times per minute, 5.5 times per minute, 3 times per minute or 1 time per minute. Taking the mobile phone as an example of the electronic device 100, the frequency threshold can be set as 5 times per minute, such that the sub-area in the display area 22 in which the change frequency of the display content is lower than 5 times per minute is the low-frequency display sub-area 222, and the sub-area in the display area 22 in which the change frequency of the display content is higher than or equal to 5 times per minute is the high-frequency display sub-area 224.

In an embodiment, the low-frequency display sub-area 222 can be the sub-area in which the refresh frequency of the display content is lower than refresh frequencies of display contents in other sub-areas in the display area 22, i.e. the refresh frequency of the low-frequency display sub-area 222 is lower than a minimum of refresh frequencies of display contents in other sub-areas in the display area 22. That is, the low-frequency display sub-area 222 at least includes the sub-area with the lowest refresh frequency in the display area 22. It can be evaluated whether the low-frequency display sub-area 222 can satisfy requirements for providing the slot 24, for example whether an area of the low-frequency display sub-area 222 is large enough, whether the process is easy to be achieved and whether an appearance of the display screen 20 can be easy to be accepted by the user. If the requirements for providing the slot 24 are satisfied, the sub-area with the lowest refresh frequency in the display area 22 is configured as the low-frequency display sub-area 222, in which case the low-frequency display sub-area 222 only includes the sub-area with the lowest refresh frequency. If the requirements for proving the slot 24 are not satisfied, the sub-area with the lowest refresh frequency still is included in the low-frequency display sub-area 222, but the sub-area with a second lowest refresh frequency in the display area 22 is also deemed as the low-frequency display sub-area 222, and then it is further judged whether the low-frequency display sub-area 222 can satisfy the requirements for providing the slot 24. As can be analogized in this manner, the finally chosen low-frequency display sub-area 222 should satisfy the requirements for providing the slot 24; that is, the slot 24 shall be provided in the low-frequency display sub-area 222. Consequently, the low-frequency display sub-area 222 has the lower refresh frequency of the display content than other sub-areas in the display area 22, as described above.

In another embodiment, the low-frequency display sub-area 222 can be a sub-area in which the refresh frequency of the display content is lower than refresh frequencies of display contents in peripheral sub-areas, i.e. the refresh frequency of the low-frequency display sub-area 222 is lower than a minimum of refresh frequencies of display contents in peripheral sub-areas. For example, the low-frequency display sub-area 222 can be a sub-area among a plurality of shortcut icons. Although the refresh frequency of such sub-area can be relatively high or relatively low, such sub-area can also be regarded as the low-frequency display sub-area 222, because the refresh frequency of such sub-area is lower than the refresh frequencies of the peripheral sub-areas.

In some embodiments, the low-frequency display sub-area 222 is a continuous sub-area, or the low-frequency display sub-area 222 includes a plurality of non-continuous sub-areas. That is, the low-frequency display sub-area 222 can be an interconnected sub-area, or the low-frequency display sub-area 222 can include a plurality of non-interconnected sub-areas.

Figure 3:
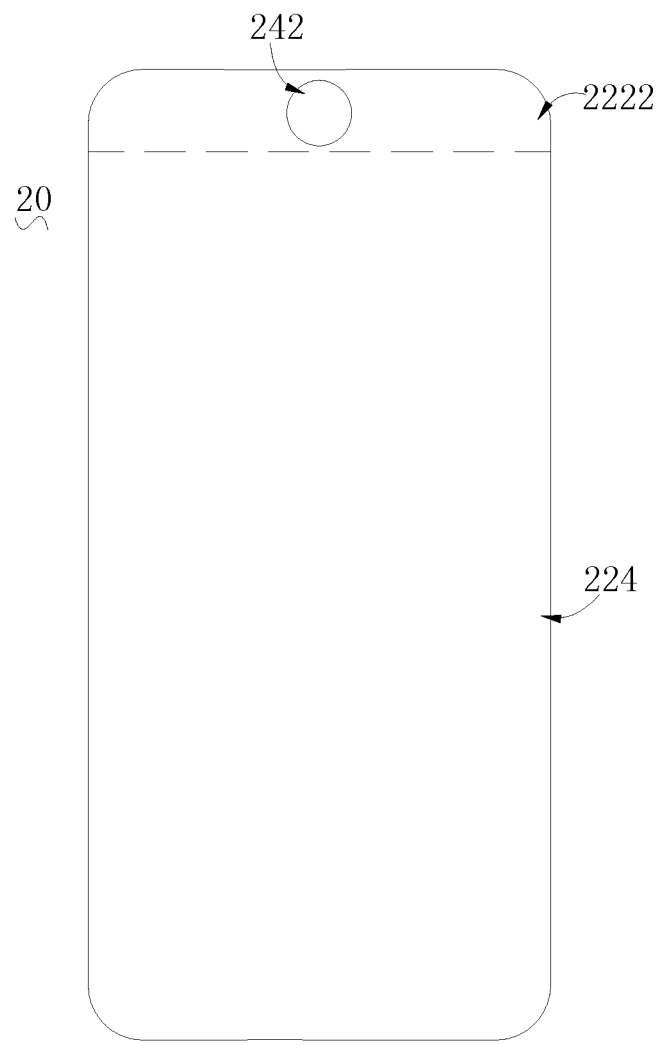
FIG. 3 is a planar view of a display screen according to an embodiment of the present disclosure.
Figure 4:
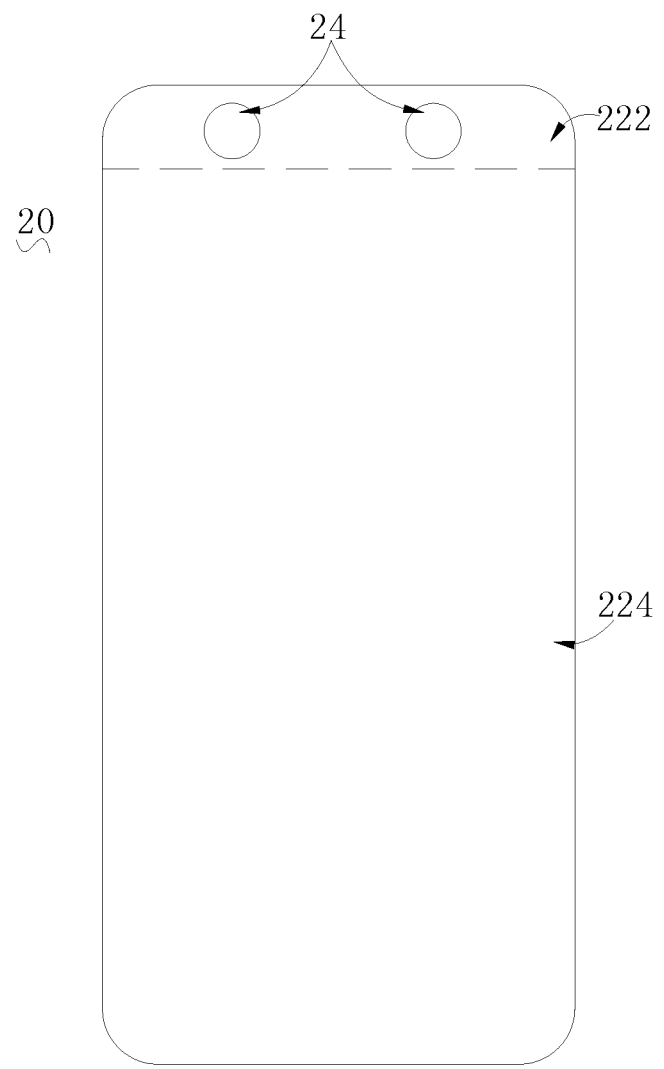
FIG. 4 is a planar view of a display screen according to an embodiment of the present disclosure.
Figure 5:
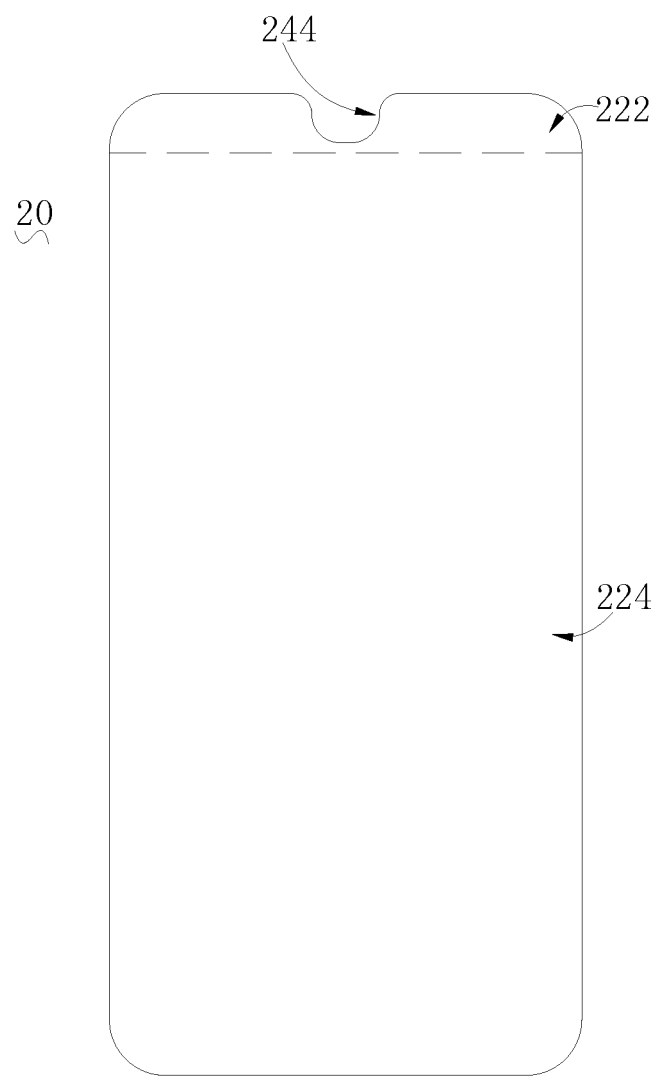
FIG. 5 is a planar view of a display screen according to an embodiment of the present disclosure.
Figure 14:
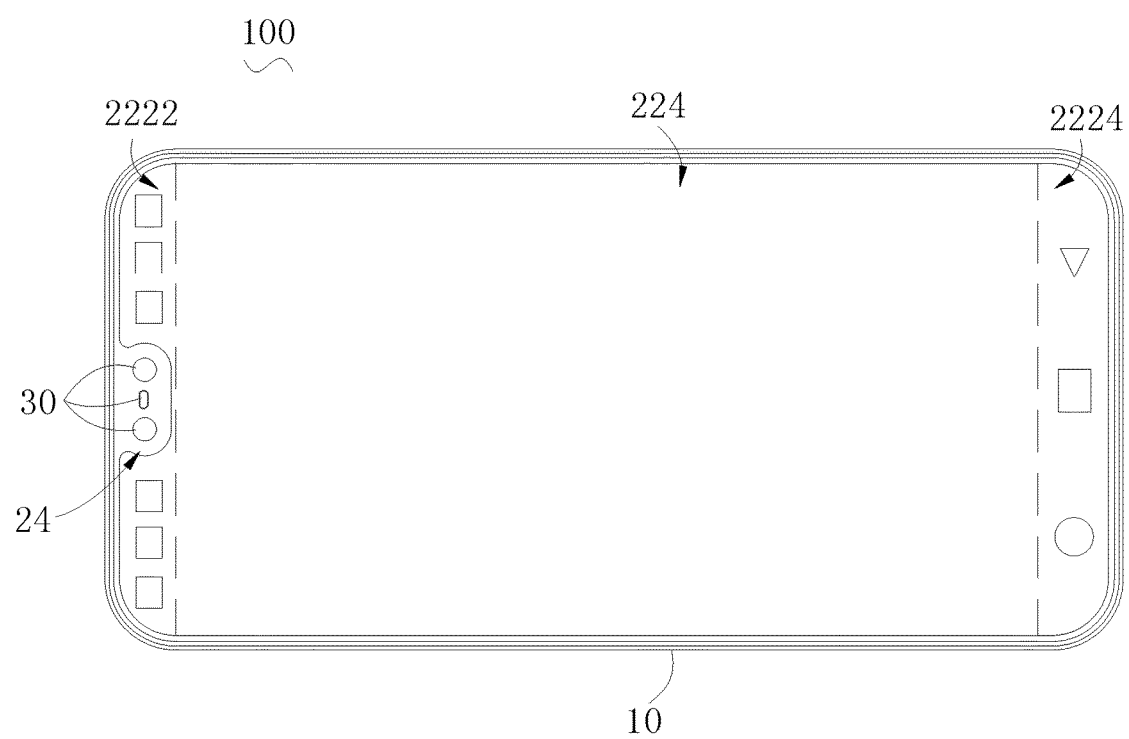
FIG. 14 is a planar view of an electronic device according to an embodiment of the present disclosure, in a case of playing games or videos in a full-screen manner.

In some embodiments of the present disclosure, the mobile phone is taken as an example of the electronic device 100. In an embodiment, as illustrated in FIG. 3, the low-frequency display sub-area 222 includes a first sub-area 2222 in the display area 22 and adjacent to the top portion 12. A plurality of state icons (e.g. Wi-Fi, Bluetooth, battery and clock) of the electronic device 100 can be displayed in the first sub-area 2222 and arranged in a transverse direction. The first sub-area 2222 further includes regions among the plurality of state icons. In some embodiments of the present disclosure, in a case of playing games or videos in a full-screen manner, the first sub-area 2222 can exhibit a plurality of shortcut icons for convenient switching among different application programs, as shown in FIG. 14. That is, the plurality of state icons can be replaced with the plurality of shortcut icons in this case, so as to make full use of the first sub-area 2222 of the low-frequency display sub-area 222.

Figure 6:
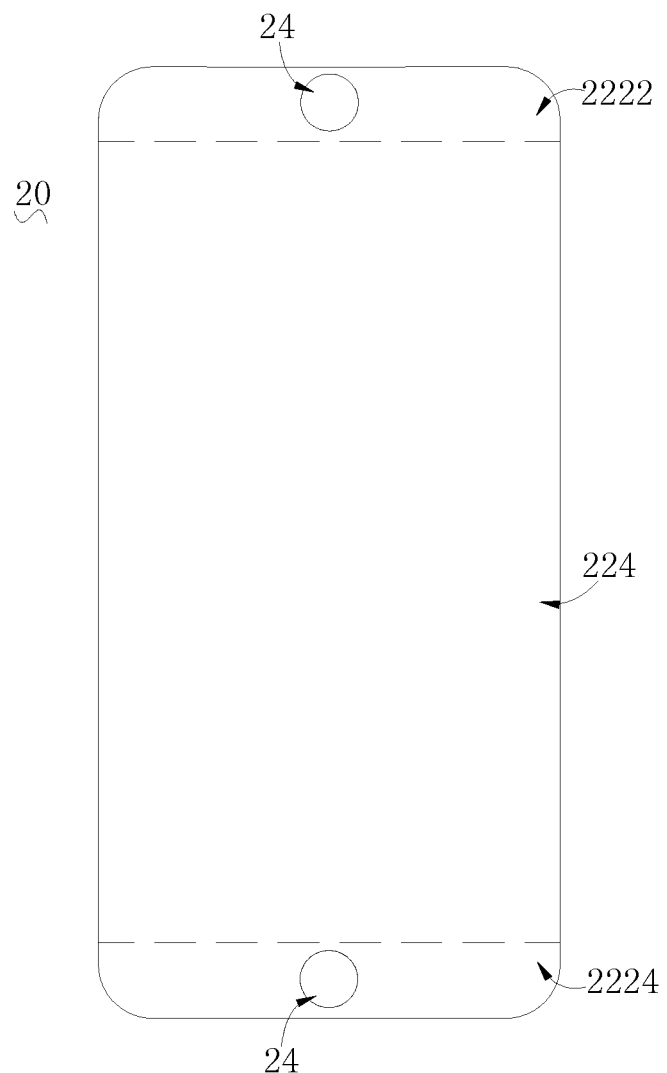
FIG. 6 is a planar view of a display screen according to an embodiment of the present disclosure.

In another embodiment, as illustrated in FIG. 6, the low-frequency display sub-area 222 includes the above first sub-area 2222, and also includes a second sub-area 2224 in the display area 22 and adjacent to the bottom portion 14. The second sub-area 2224 can be used to display a plurality of virtual keys of the electronic device 100, e.g. a return key or a reset key, and the plurality of virtual keys can be arranged in the transverse direction. The second sub-area 2224 further includes regions among the plurality of virtual keys, and the second sub-area 2224 is not continuous with the first sub-area 2222. It can be understood that, the high-frequency display sub-area 224 includes the sub-area in the display area 22, apart from the low-frequency display sub-area 222.

As illustrated in FIGS. 2-6, in embodiments of the present disclosure, the display screen 20 is provided with the slot 24 in the low-frequency display sub-area 222. In some embodiments of the present disclosure, the slot 24 can be a hole 242, and the hole 242 is spaced apart from an edge of the display area 22. The slot 24 can also be a notch 244, and the notch 244 is provided at the edge of the display area 22. The slot 24 can also include both the hole 242 and the notch 244, the hole 242 is spaced apart from the edge of the display area 22 and the notch 244 is provided at the edge of the display area 22. It can be understood that, the slot 24 can be provided in a part of the-low frequency display sub-area 222 which does not need to display feature icons. For example, the slot 24 can be provided in a gap among the above state icons, or provided in a gap among the above virtual keys, so as to reduce an influence of the slot 24 on a normal display of the electronic device 100.

One slot 24 can be provided, or a plurality of slots 24 (e.g. three, four or five slots 24) can be provided. The slot 24 can have a round shape, an oval shape, a racetrack shape, a rectangle shape, a heart shape or a half-round shape. The plurality of slots 24 can be distributed at equal intervals. Centers of the plurality of slots 24 can be distributed in the same straight line, or the centers of the plurality of slots 24 can be connected in a particular shape.

As illustrated in FIG. 2, in some embodiments, the display screen 20 further includes a display surface 26 and a back surface 28. The display surface 26 is opposite to the back surface 28, the display area 22 is distributed in the display surface 26, and the display surface 26 can be parallel to the back surface 28. The slot 24 runs through the display surface 26 and the back surface 28. Thus, the slot 24 is easy to be processed and obtained, and a depth of the slot 24 is relatively large, such that the input-output component 30 can be conveniently disposed in the slot 24.

Figure 7:
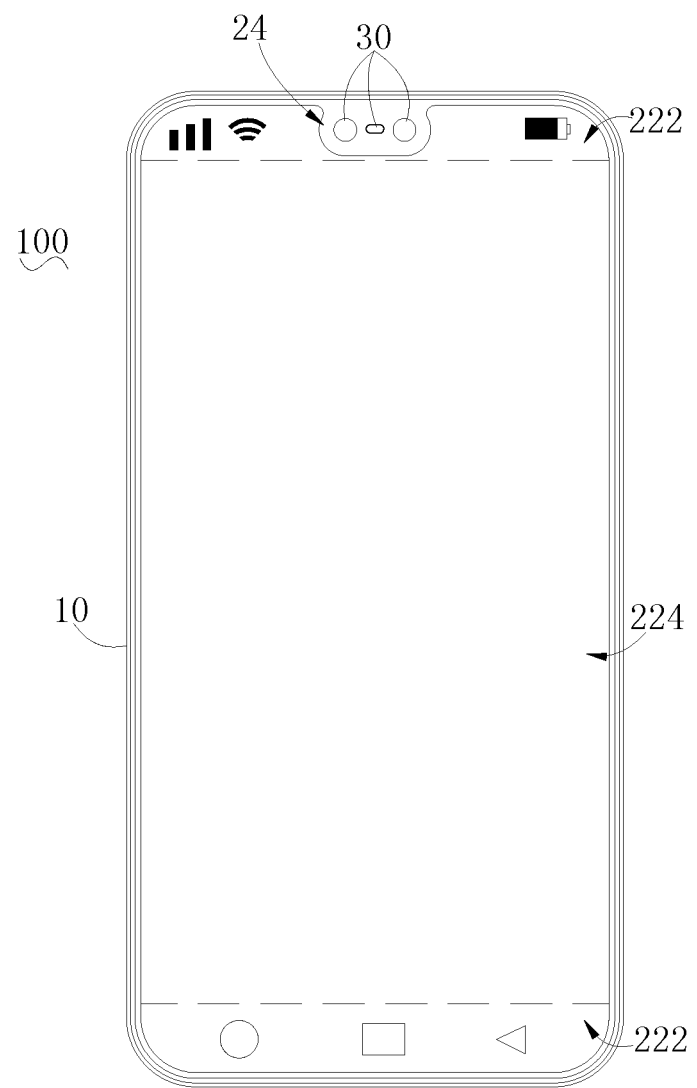
FIG. 7 is a planar view of an electronic device according to an embodiment of the present disclosure.
Figure 8:
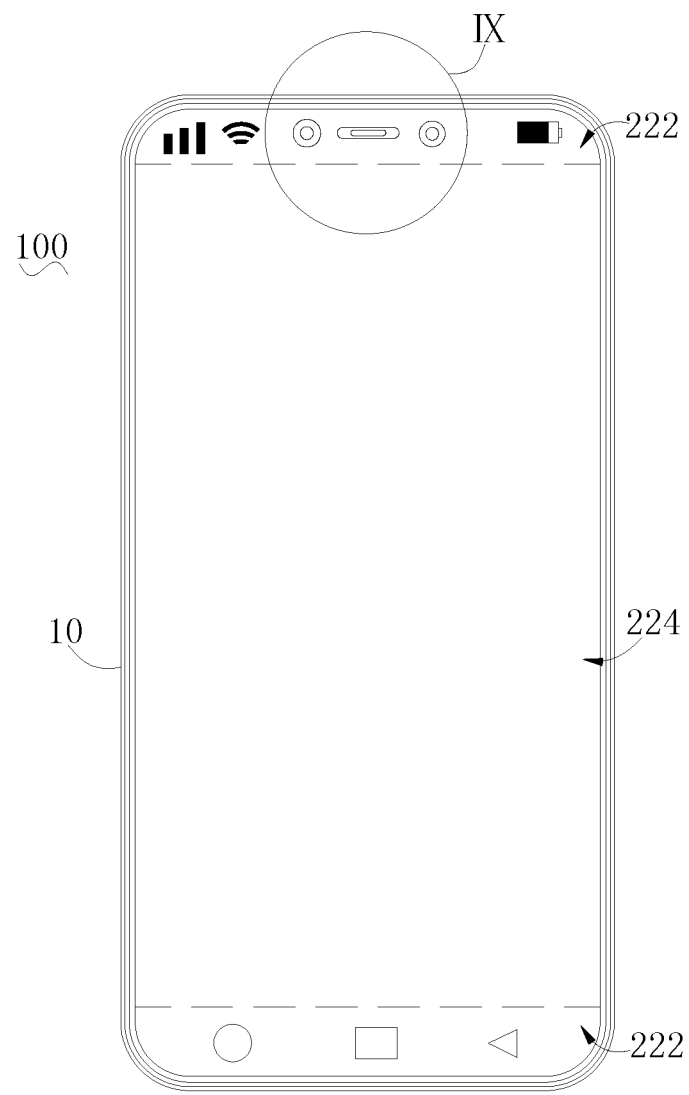
FIG. 8 is a planar view of an electronic device according to an embodiment of the present disclosure.
Figure 9:
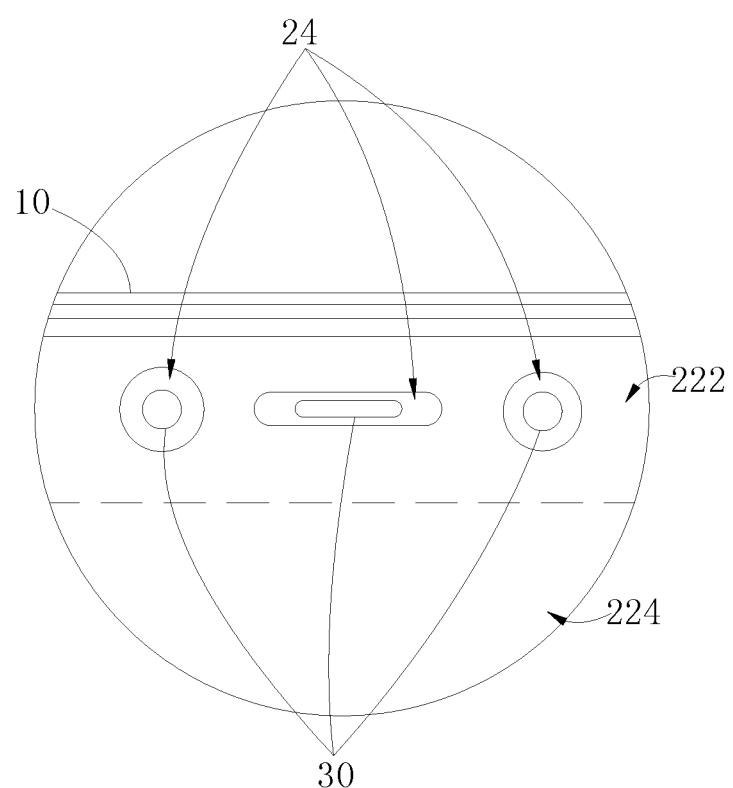
FIG. 9 is an enlarged view of part IX of the electronic device in FIG. 8.

As illustrated in FIG. 7-9, the input-output component 30 is disposed correspondingly to the slot 24, so as to allow the input-output component 30 to receive signals from outside and/or emit signals to outside through the slot 24. In some embodiments of the present disclosure, the input-output component 30 can include one or more of a camera 32, an optical sensor, a receiver and a fingerprint identification module. The camera 32 can receive light signals from outside through the slot 24, so as to obtain image information. The optical sensor can receive light signals from outside through the slot 24, so as to obtain light-intensity information. The receiver can emit acoustic-wave information to outside through the slot 24. The fingerprint identification module can emit the light-wave information or the acoustic-wave information to outside, and receive the reflected light-wave information or the reflected acoustic-wave information, so as to obtain fingerprint information. In the light of requirements of different types of the electronic devices 100, the type and amount of the input-output component 30 carried on the electronic device 100 can be different. For example, in the mobile phone in the example of the present disclosure, the input-output component 30 includes the camera 32, the optical sensor and the receiver.

As illustrated in FIG. 7, in some embodiments, a plurality of input-output components 30 are provided, and one slot 24 is provided. The plurality of input-output components 30 and the one slot 24 are arranged correspondingly in terms of position. That is, the plurality of input-output components 30 are arranged in the one slot 24. Thus, the plurality of input-output components 30 has a compact structure, and the slot 24 has a small area, thereby further improving a screen-to-body ratio of the electronic device 100. Furthermore, the plurality of input-output components 30 can be integrated into one input-output module (not illustrated). In the input-output module, the plurality of input-output components 30 can be stacked, so as to further reduce the area of the slot 24.

As illustrated in FIGS. 8 and 9, in some embodiments, a plurality of input-output components 30 are provided, a plurality of slots 24 are provided and the amount of the slots 24 is equal to the amount of the input-output components 30. Each input-output component 30 and one corresponding slot 24 are arranged correspondingly in terms of position. That is, each input-output component 30 is arranged in the one corresponding slot 24. Thus, there is a large degree of freedom to arrange the input-output components 30, so as to avoid mutual effects among the different input-output components 30.

Figure 10:
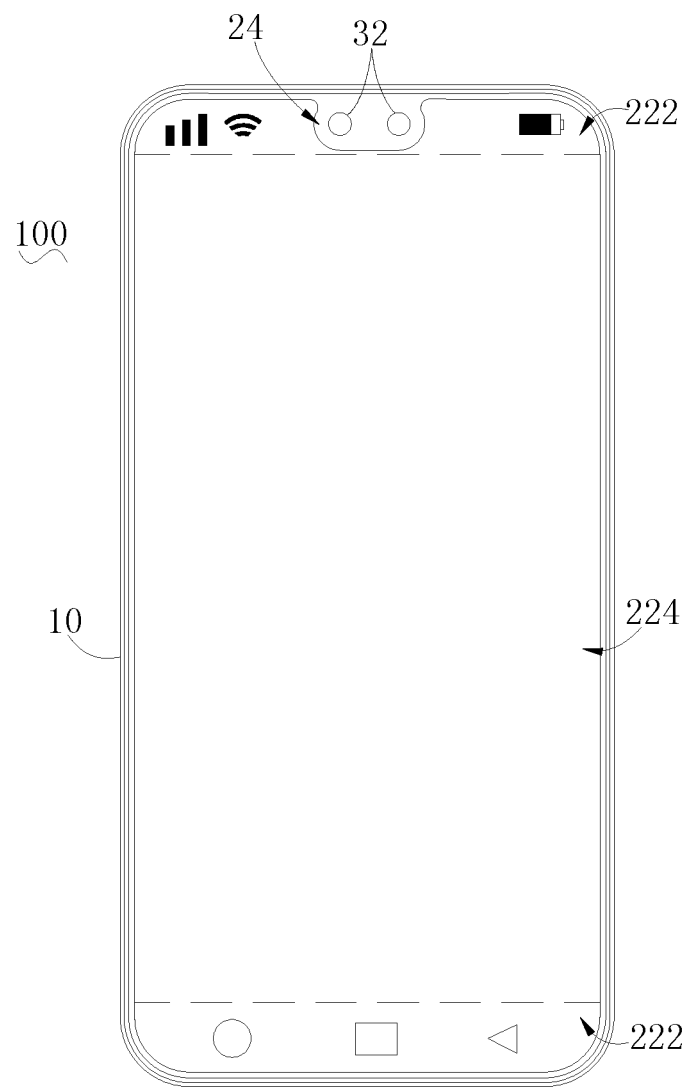
FIG. 10 is a planar view of an electronic device according to an embodiment of the present disclosure.
Figure 11:
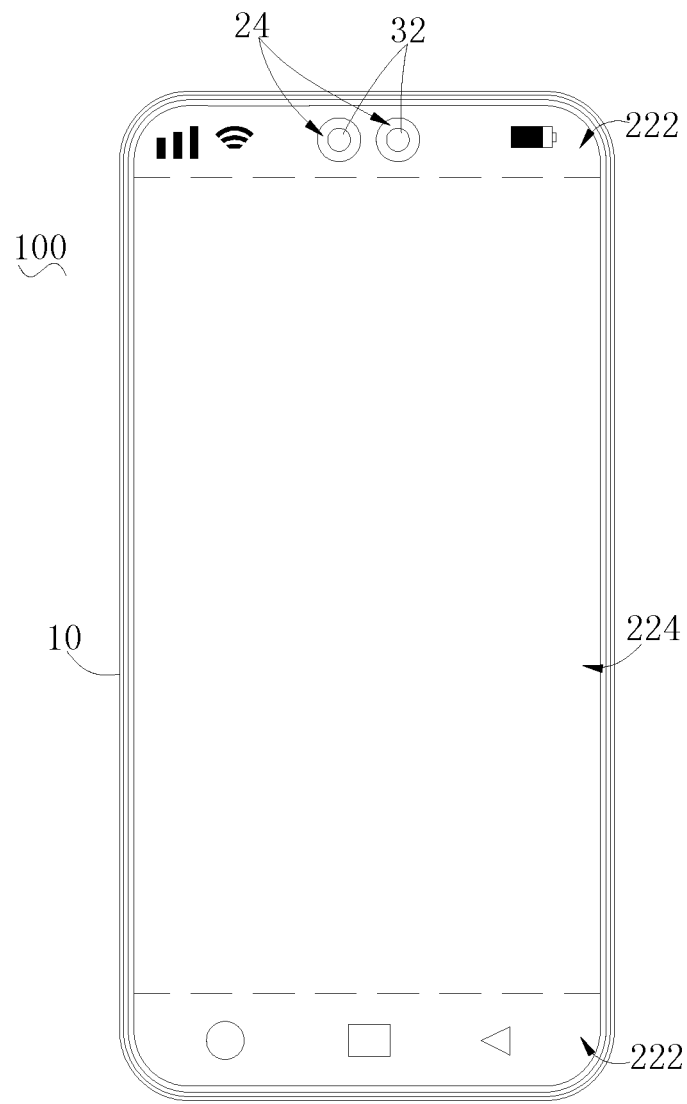
FIG. 11 is a planar view of an electronic device according to an embodiment of the present disclosure.

As illustrated in FIG. 10, in some embodiments, the input-output component 30 includes the camera 32, and two cameras 32 are provided. One slot 24 is provided, and the two cameras 32 and the one slot 24 are correspondingly arranged in terms of position. That is, the two cameras 32 are arranged in the one slot 24. Or, a plurality of slots 24 are provided (as illustrated in FIG. 11), each camera 32 and one corresponding slot 24 are arranged correspondingly in terms of position. That is, each camera 32 is arranged in the one corresponding slot 24. Thus, the electronic device 100 includes two cameras 32, and the electronic device 100 can obtain a great image through the two cameras 32, thus further extending functions of the electronic device 100. In some embodiments of the present disclosure, the two cameras 32 can be arranged in the transverse direction or in a longitudinal direction.

Figure 12:
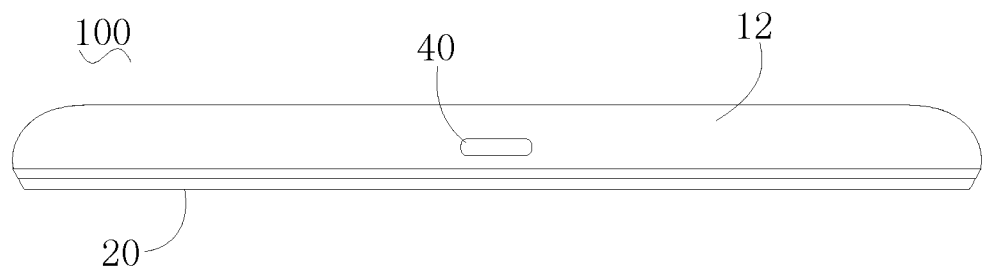
FIG. 12 is a top view of an electronic device according to an embodiment of the present disclosure.
Figure 13:
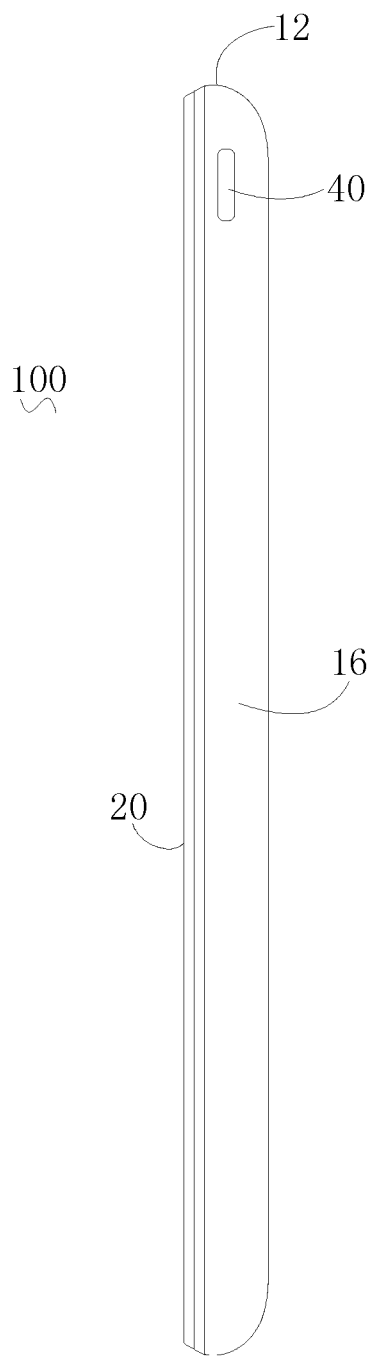
FIG. 13 is a side view of an electronic device according to an embodiment of the present disclosure.

As illustrated in FIGS. 12 and 13, in some embodiments, the electronic device 100 further includes a receiver 40, and the receiver 40 is disposed to the top portion 12 or the lateral portion 16. In some embodiments of the present disclosure, the receiver 40 can be located in a middle position of the top portion 12, or the receiver 40 can also be located in a position deviated from the middle position of the top portion 12. A sound hole can also be provided to the lateral portion 16 and adjacent to the top portion 12. Thus, since the receiver 40 is disposed to the top portion 12 or the lateral portion 16, a space of the display screen 20 is saved, thereby improving the screen-to-body ratio of the electronic device 100.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics can be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" can comprise one or more of this feature. In the description of the present disclosure, "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An electronic device, comprising a display screen, the display screen comprising a display area, the display area comprising a low-frequency display sub-area, a change frequency of a display content in the low-frequency display sub-area being lower than a preset frequency threshold, and the display screen being provided with a slot in the low-frequency display sub-area, and an input-output component, the input-output component being disposed correspondingly to the slot, so as to allow the input-output component to receive signals from outside and/or emit signals to outside through the slot.

2. The electronic device according to claim 1, wherein the preset frequency threshold is lower than or equal to a minimum of change frequencies of display contents in other sub-areas of the display area.

3. The electronic device according to claim 1, wherein the preset frequency threshold is lower than or equal to a minimum of change frequencies of display contents in peripheral sub-areas of the low-frequency display sub-area.

4. The electronic device according to claim 1, wherein the display screen comprises a display surface and a back surface opposite to the display surface, and the slot runs through the display surface and the back surface.

5. The electronic device according to claim 1, wherein the low-frequency display sub-area is configured as a continuous sub-area.

6. The electronic device according to claim 1, wherein the low-frequency display sub-area comprises a plurality of non-continuous sub-areas.

7. The electronic device according to claim 1, wherein the display screen is any one of an organic light-emitting diode display screen, a flexible organic light-emitting diode display screen and a liquid crystal display screen.

8. The electronic device according to claim 1, wherein the slot comprises a hole, and the hole is spaced apart from an edge of the display area.

9. The electronic device according to claim 1, wherein the slot comprises a notch, and the notch is provided at an edge of the display area.

10. The electronic device according to claim 1, wherein the slot comprises a hole and a notch, the hole is spaced apart from an edge of the display area, and the notch is provided at an edge of the display area.

11. The electronic device according to claim 1, wherein a plurality of input-output components are provided, and one slot is provided, in which the plurality of input-output components and the one slot are arranged correspondingly in terms of position.

12. The electronic device according to claim 1, wherein a plurality of input-output components are provided, a plurality of slots are provided and the amount of the slots is equal to the amount of the input-output components, in which each input-output component and one corresponding slot are arranged correspondingly in terms of position.

13. The electronic device according to claim 1, wherein the input-output component comprises at least one of a camera, an optical sensor, and a receiver.

14. The electronic device according to claim 1, wherein the input-output component comprises two cameras, one slot is provided, the two cameras and the one slot are correspondingly arranged in terms of position.

15. The electronic device according to claim 1, wherein the input-output component comprises two cameras, a plurality of slots are provided, each camera and one corresponding slot are correspondingly arranged in terms of position.

16. The electronic device according to claim 1, wherein the electronic device further comprises a body, the display screen is disposed in the body, the body comprises a top portion, a bottom portion and a lateral portion connected with the top portion and the bottom portion, the electronic device further comprises a receiver disposed to the top portion or the lateral portion.

17. The electronic device according to claim 16, wherein the electronic device further comprises a sound hole, and the sound hole is provided to the lateral portion and adjacent to the top portion.

18. An electronic device, comprising a body and a display screen disposed in the body, the display screen comprising a low-frequency display area, a change frequency of a display content in the low-frequency display area being lower than a preset frequency threshold, and the display screen being provided with a slot in the low-frequency display area, and an input-output component, the input-output component being disposed correspondingly to the slot, so as to allow the input-output component to receive signals from outside and/or emit signals to outside through the slot.

19. A display screen, comprising a display area, the display area comprising a low-frequency display sub-area, a change frequency of a display content in the low-frequency display sub-area being lower than a preset frequency threshold, and the display screen having a slot in the low-frequency display sub-area, and an input-output component, the input-output component being disposed correspondingly to the slot, so as to allow the input-output component to receive signals from outside and/or emit signals to outside through the slot.

\* \* \* \* \*